US012374983B2

United States Patent
Castorina et al.

(10) Patent No.: US 12,374,983 B2
(45) Date of Patent: Jul. 29, 2025

(54) CONTROL DEVICE FOR A SWITCHING VOLTAGE REGULATOR HAVING IMPROVED CONTROL PERFORMANCE AND CONTROL METHOD

(71) Applicant: STMICROELECTRONICS S.r.l., Agrate Brianza (IT)

(72) Inventors: Stefano Castorina, Milan (IT); Elena Brigo, Milan (IT); Ivan Floriani, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 238 days.

(21) Appl. No.: 18/330,754

(22) Filed: Jun. 7, 2023

(65) Prior Publication Data
US 2023/0421039 A1 Dec. 28, 2023

(30) Foreign Application Priority Data

Jun. 22, 2022 (IT) .......................... 102022000013240

(51) Int. Cl.
*H02M 1/00* (2007.01)

(52) U.S. Cl.
CPC ....... *H02M 1/0025* (2021.05); *H02M 1/0009* (2021.05); *H02M 1/0012* (2021.05); *H02M 1/0019* (2021.05)

(58) Field of Classification Search
CPC .. H02M 1/0025; H02M 1/009; H02M 1/0019; H02M 1/0012; H02M 3/158; H02M 3/1582
See application file for complete search history.

(56) References Cited

U.S. PATENT DOCUMENTS

| | | | |
|---|---|---|---|
| 8,896,279 B2* | 11/2014 | Wu | H02M 3/1588 323/272 |
| 11,070,132 B2 | 7/2021 | Chen et al. | |
| 12,218,596 B2* | 2/2025 | Floriani | H02M 1/0003 |
| 2015/0381039 A1 | 12/2015 | Hari et al. | |
| 2023/0359235 A1* | 11/2023 | Floriani | H02M 1/325 |
| 2024/0088790 A1* | 3/2024 | Floriani | H02M 1/0025 |
| 2024/0210978 A1* | 6/2024 | Floriani | G05F 1/575 |

FOREIGN PATENT DOCUMENTS

JP 5369555 B2 12/2013

* cited by examiner

*Primary Examiner* — Adolf D Berhane
(74) *Attorney, Agent, or Firm* — Seed IP Law Group LLP

(57) ABSTRACT

Provided is a control device is for a switching voltage regulator having a switching circuit. The control device receives input and output voltages of the switching circuit and a measurement signal indicative of a current of the switching circuit. The control device has: a feedback module that detects an error signal indicative of a difference between the output voltage and a nominal voltage, and provides a control signal as a function of the error signal; a threshold-correction module that provides offset and ramp signals; and a driving-signal generation module coupled to the feedback and threshold-correction modules, which receives the measurement signal, compares the measurement signal with a threshold and, in response, provides a modulated signal for driving the switching circuit. The threshold is a function of the control, offset and ramp signals. The threshold-correction module provides the offset signal as a function of the input or output voltages.

20 Claims, 13 Drawing Sheets

CONTROL DEVICE FOR A SWITCHING VOLTAGE REGULATOR HAVING IMPROVED CONTROL PERFORMANCE AND CONTROL METHOD

BACKGROUND

Technical Field

The present disclosure relates to a control device for a switching voltage regulator having improved control performance and to a control method.

Description of the Related Art

As is known, a switching voltage regulator is able to convert an input d.c. voltage into an output d.c. voltage using different operating schemes and may be obtained using different topologies, of which one of the most widespread is the four-switch non-inverting topology.

FIG. 1 shows a switching voltage regulator 1 comprising a four-switch non-inverting switching circuit, referred to hereinafter as switching circuit 3, and a control device 5.

The switching circuit 3 is formed by a first half bridge 7, a second half bridge 9, and an inductor 10.

The first half bridge 7 is formed by a first high-side switch 11 and a first low-side switch 13, here two NMOS transistors, coupled in series between an input terminal 15 and a common node 17.

The common node 17 is coupled to a reference-potential line (ground) 18 via a shunt resistor 19.

An input voltage Vin with respect to ground 18 is applied to the input terminal 15.

The second half bridge 9 is formed by a second high-side switch 20 and a second low-side switch 22, also here two NMOS transistors, coupled in series between an output node 24 and the common node 17.

An output voltage Vout, referenced to ground 18, is present at the output node 24 and is applied to a load 25.

The inductor 10 is coupled between an intermediate node of the first half bridge 7 and an intermediate node of the second half bridge 9.

As a function of the ratio between the input voltage Vin and the output voltage Vout, the switching voltage regulator 1 may work in one of three operating modes also known as "buck" if Vin>Vout, "boost" if Vin<Vout, and "buck-boost" if Vin≈Vout.

According to the operating mode, by appropriately controlling switching of the first and the second half bridges 7, 9, it is in fact possible to cause the output voltage Vout to remain at a reference voltage Vref, chosen, for example, by a user according to a specific application, irrespective of the value of the input voltage Vin.

For this purpose, the control device 5 is coupled to the input node 15 and to the output node 24 and receives the reference voltage Vref.

It is known to design the control device 5 so that it performs a current control of the switching circuit 3; in this regard, the control device 5 measures the current that flows, in use, through the shunt resistor 19, which is indicative of the current $I_L$ that flows through the inductor 10.

In detail, FIG. 2, the control device 5 forms a loop control circuit comprising a loop control circuit 30 that measures an error between the output voltage Vout and the reference voltage Vref and generates a control signal $I_C$; a ramp generator 32 that generates a current ramp $I_{slope}$; a PWM modulator 34 that compares the current $I_L$ with a sum current $I_C+I_{slope}$ and generates a modulated signal PWM; and a driving logic 36 that generates the switch-control signals T1, T2, T3, T4 starting from the modulated signal PWM.

In the control device 5, the modulated signal PWM has a fixed period of duration T, and the PWM modulator 34 modifies, in use, the duty-cycle of each period of the modulated signal PWM as a function of the comparison between the sum current $I_C+I_{slope}$ and the current $I_L$.

However, the Applicant has found that the current ramp $I_{slope}$ reduces the control performance of the known regulator 1, in specific operating conditions.

For instance, FIG. 3 shows waveforms of the known regulator of FIG. 2, in use, in a buck operating mode with a valley-type control. In this operating mode, at the start of a cycle of the modulated signal PWM, the regulator 1 is in an OFF phase wherein the current $I_L$ decreases.

When the PWM modulator 34 detects that the current $I_L$ is equal to the sum current $I_C+I_{slope}$, the PWM modulator 34 switches the modulated signal PWM, and the regulator 1 enters an ON phase, wherein the current $I_L$ increases in time.

As is known, if the duty-cycle of the PWM signal is less than 50%, i.e., if the duration of the ON phase is less than half of the duration T, a perturbation ΔI in the current $I_L$ may cause the known phenomenon of subharmonic oscillations of the current $I_L$ (dotted line in FIG. 3). The subharmonic oscillations may cause instability of the regulator 1.

The presence of the ramp current $I_{slope}$ allows the subharmonic oscillations of the current $I_L$ to be compensated for within a few cycles of the modulated signal PWM, as illustrated by the dotted line in FIG. 3. This thus allows to prevent the regulator 1 from being subject to instability that might jeopardize the functioning thereof.

However, the Applicant has found that the ramp current $I_{slope}$ reduces the control performance of the control device 5 and reduces the capacity of the regulator 1 to keep the output voltage Vout at the desired value Vref as the current that flows in the load 58 varies. In particular, the higher the ramp current $I_{slope}$, the lower the maximum current that may be regulated by the regulator 1, especially when the difference between the input voltage Vin and the output voltage Vout is high, for example, when Vin=40 V and Vout=5 V.

BRIEF SUMMARY

According to the present disclosure a control device for a switching voltage regulator, a switching voltage regulator, and a control method for a switching voltage regulator are provided.

BRIEF DESCRIPTION OF THE SEVERAL VIEWS OF THE DRAWINGS

For a better understanding of the present disclosure, some embodiments thereof are now described purely by way of non-limiting example, with reference to the attached drawings, wherein.

DETAILED DESCRIPTION

Figure 4:
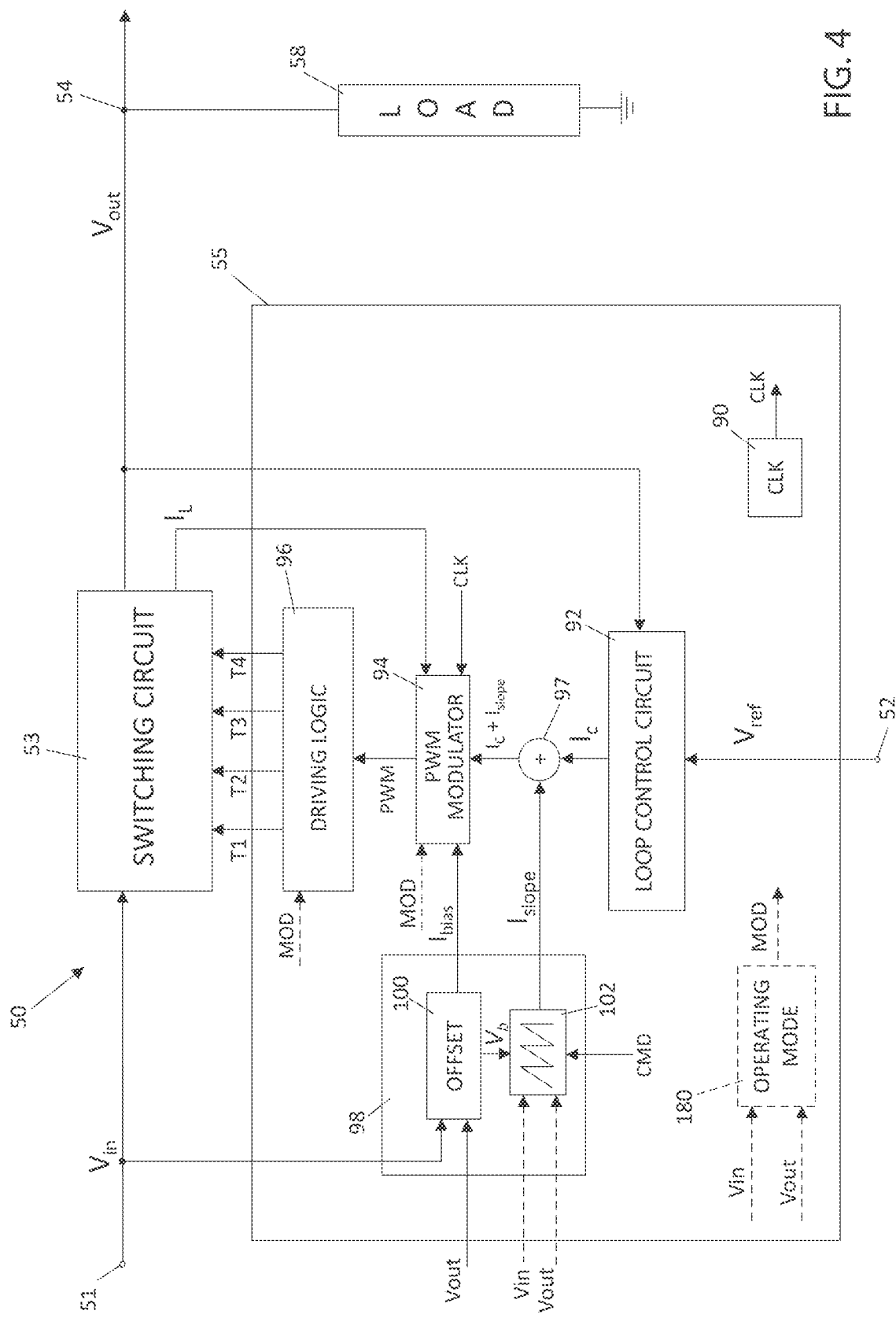
FIG. 4 shows a block diagram of an embodiment of the present voltage regulator comprising a switching circuit and a control device.

FIG. 4 shows a block diagram of a switching voltage regulator 50, also referred to hereinafter simply as regulator 50, comprising a switching circuit 53 and a control device (e.g., controller) 55, mutually coupled.

The regulator 50 has an input node 51 from which it receives an input voltage $V_{in}$, a reference node 52 from which it receives a nominal or reference voltage $V_{ref}$, and an output node 54 to which it supplies an output voltage $V_{out}$. A load 58 is coupled to the output node 54 of the regulator 50.

In detail, the regulator 50 is a DC-DC converter of the buck-boost type, configured to generate the output voltage $V_{out}$, starting from the input voltage $V_{in}$, so that the output voltage $V_{out}$ will be equal to the reference voltage $V_{ref}$, which may be chosen by a user according to the specific application.

The switching circuit 53 and the control device 55 may be integrated in the same die or formed in different dice.

Figure 5:
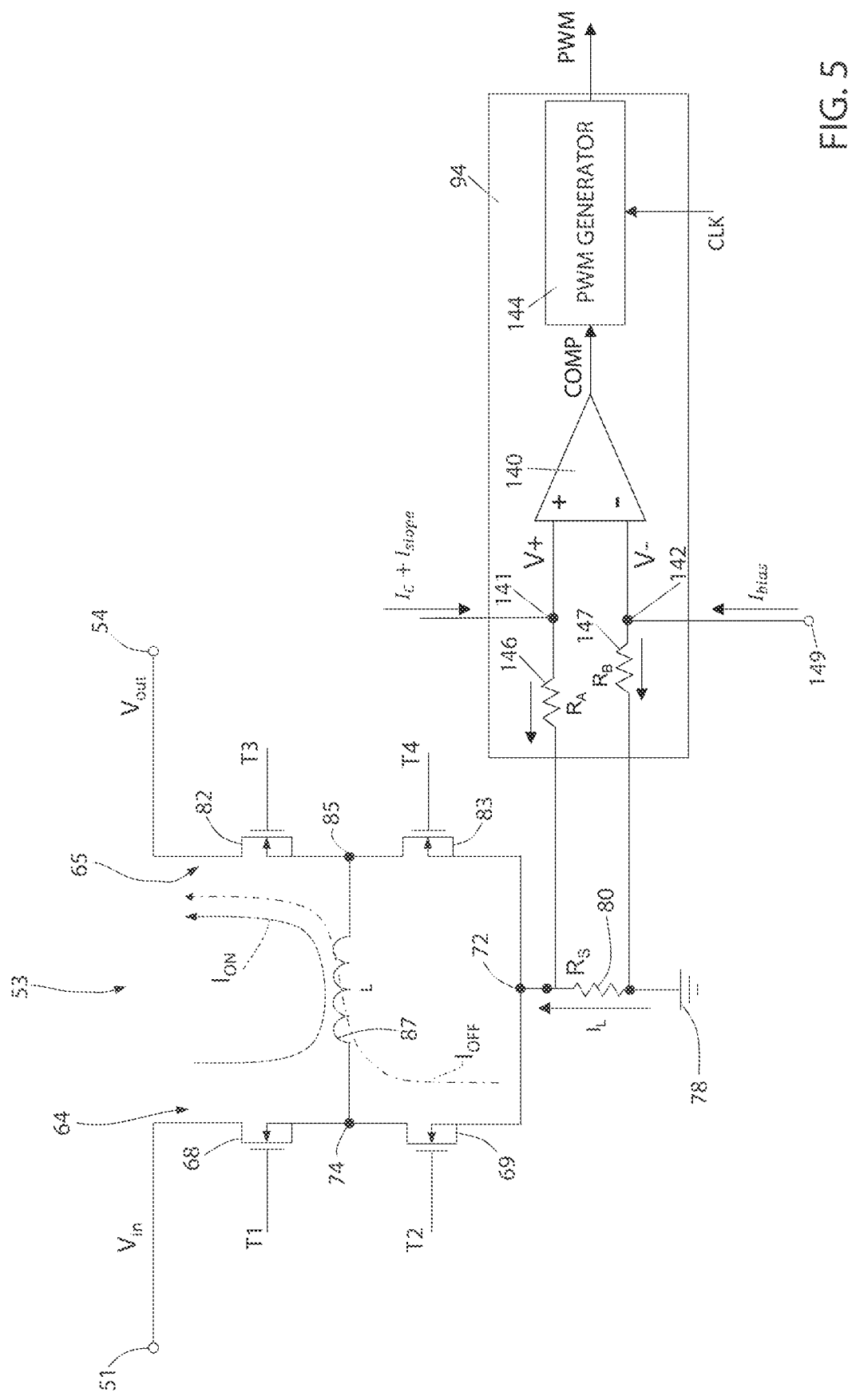
FIG. 5 shows a circuit diagram of the switching circuit and of a portion of the control device of the voltage regulator of FIG. 4.

The switching circuit 53, illustrated in detail in FIG. 5, is here a four-switch non-inverting circuit, in particular configured to operate in buck mode, boost mode, or buck-boost mode, according to whether the input voltage $V_{in}$ is, respectively, greater than, smaller than, or approximately equal to the output voltage $V_{out}$ (or the reference voltage $V_{ref}$).

In detail, the switching circuit 53 is formed by a first half bridge 64 and a second half bridge 65.

The first half bridge 64 is formed by a first high-side switch 68 and a first low-side switch 69, here two NMOS transistors, coupled in series between the input node 51 and a common node 72.

In detail, the first high-side switch 68 is coupled between the input node 51 and an intermediate node 74 of the first half bridge 64, and the first low-side switch 69 is coupled between the intermediate node 74 of the first half bridge 64 and the common node 72.

The input node 51 is at the input voltage $V_{in}$ with respect to a reference-potential line (ground) 78.

The common node 72 is coupled to ground 78 via a shunt resistor 80 having a resistance $R_S$.

The second half bridge 65 is formed by a second high-side switch 82 and a second low-side switch 83, also here two NMOS transistors, coupled in series between the output node 54 and the common node 72.

In detail, the second high-side switch 82 is coupled between the output node 54 and an intermediate node 85 of the second half bridge 65, and the second low-side switch 83 is coupled between the intermediate node 85 of the second half bridge 65 and the common node 72.

The output node 54 supplies the output voltage $V_{out}$, with respect to ground 78.

The switching circuit 53 also comprises an inductor 87 having an inductance L and coupled between the intermediate node 74 of the first half bridge 64 and the intermediate node 85 of the second half bridge 65.

The first high-side switch 68, the first low-side switch 69, the second high-side switch 82, and the second low-side switch 83 are each controlled by a respective switch-control signal T1, T2, T3, T4.

The control device 55 is configured to perform a current control of the switching circuit 53.

The control device 55 is coupled to the input node 51, to the output node 54, and to the reference node 52.

Furthermore, the control device 55 is also coupled to the shunt resistor 80 so as to detect the current that flows, in use, through the shunt resistor 80, indicative of a current $I_L$ that flows through the inductor 87.

The control device 55 comprises a clock 90, which provides a clock signal CLK, for example, a periodic square-wave signal. In this embodiment, the clock signal CLK has a period of fixed duration T.

However, the clock signal CLK may have a period of variable duration.

Figure 6:
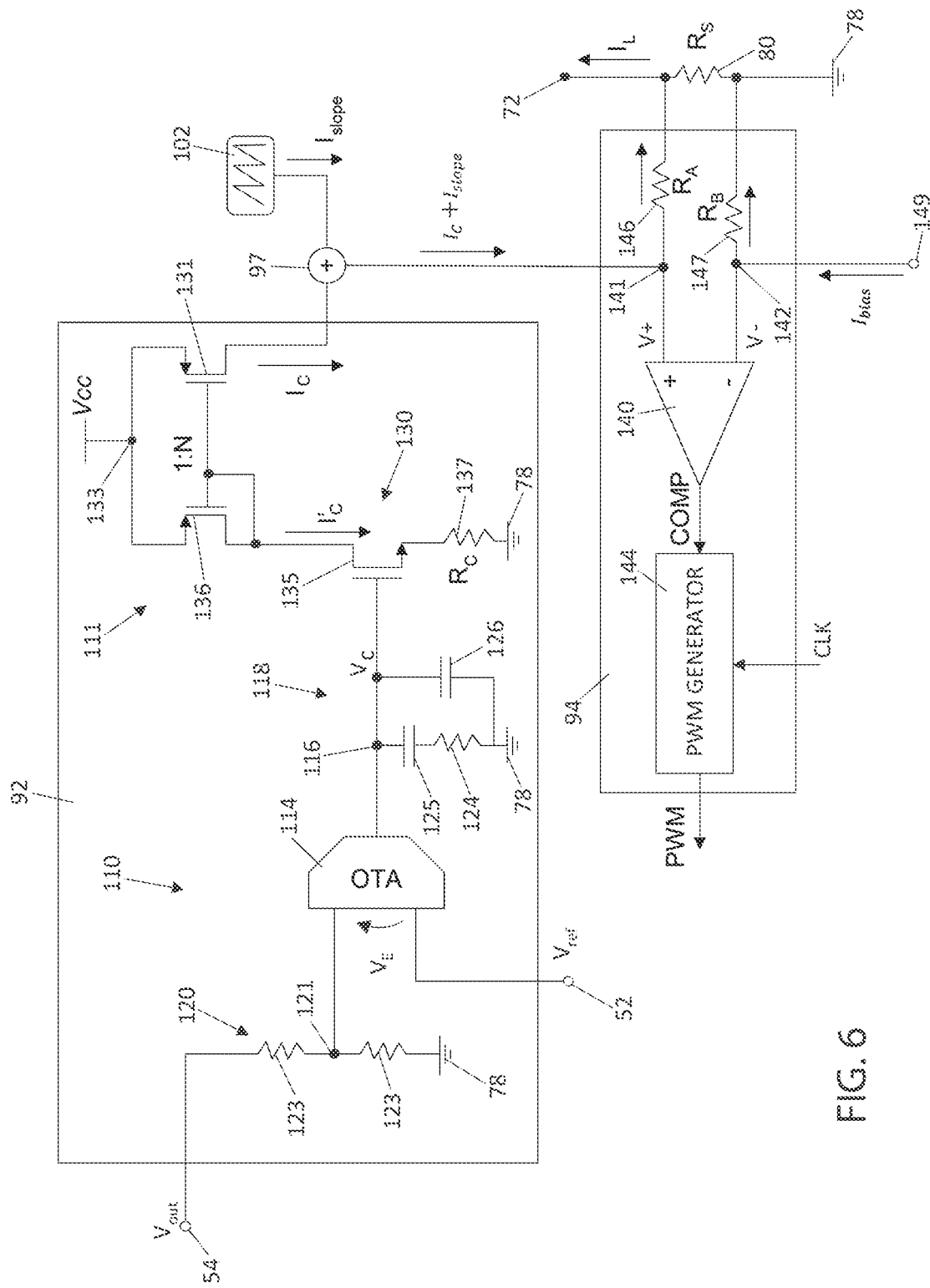
FIG. 6 shows a circuit diagram of a portion of the control device of the voltage regulator of FIG. 4.

With reference to FIGS. 4 and 6, the control device 55 further comprises a loop control (feedback) circuit or module 92 coupled to the output node 54 and to the reference node 52; a PWM modulator 94 coupled to the shunt resistor 80 and providing a modulated signal PWM; and a driving logic circuit or module 96 providing the switch-control signals T1, T2, T3, T4 starting from the modulated signal PWM.

The feedback circuit 92 receives the output voltage $V_{out}$ and the reference voltage $V_{ref}$ and provides a loop control current $I_C$ to a sum node 97, as a function of an error signal $V_E$ indicative of the difference between the output voltage $V_{out}$ and the reference voltage $V_{ref}$.

Figure 7:
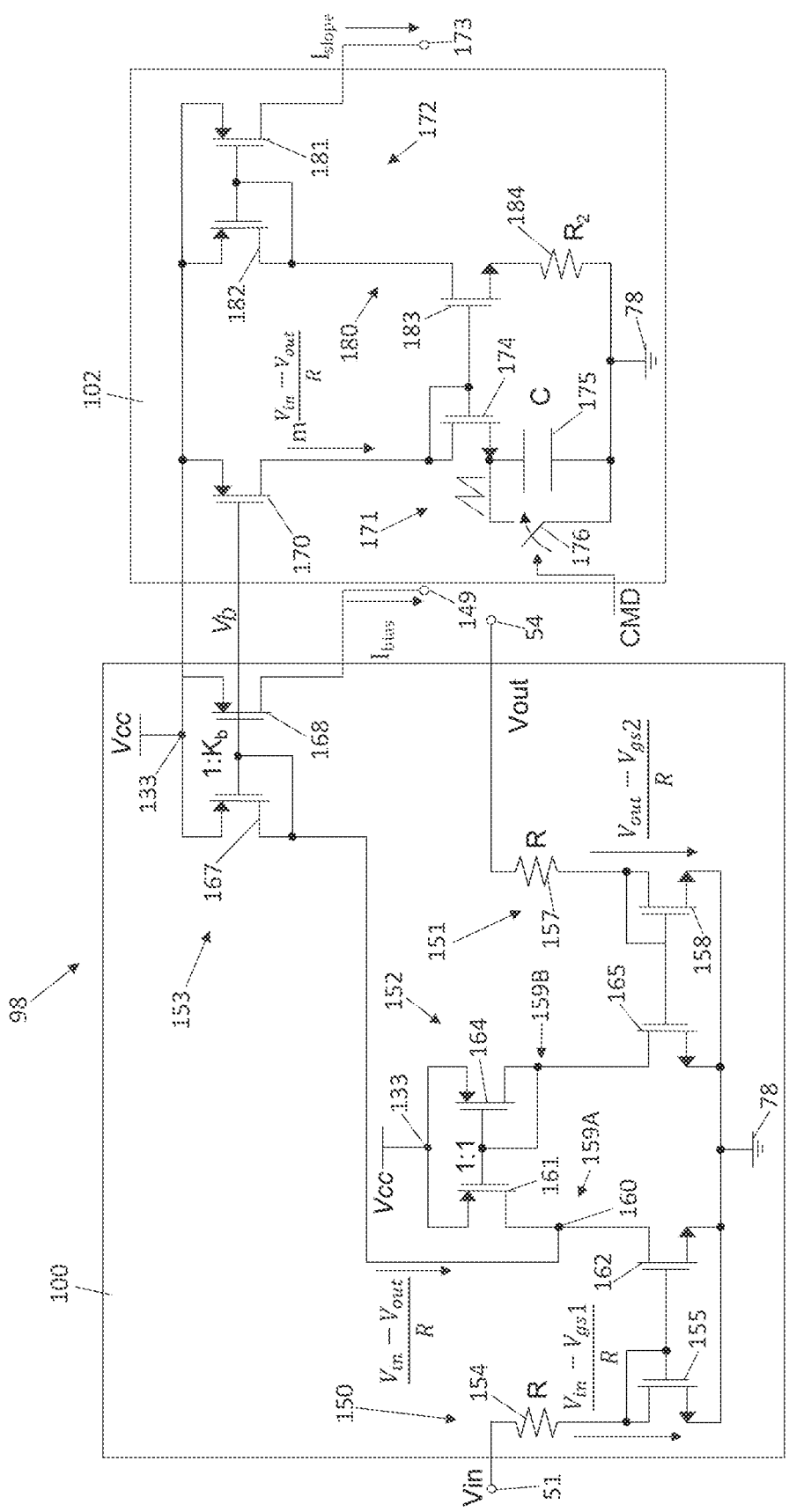
FIG. 7 shows a circuit diagram of a different portion of the control device of the voltage regulator of FIG. 4.

The control device 55 further comprises a threshold-correction circuit or module 98, an embodiment of which is illustrated in detail in FIG. 7, receiving the input voltage $V_{in}$ and the output voltage $V_{out}$ and comprising an offset generator 100, which provides an offset signal, here an offset current $I_{bias}$, and a ramp generator 102, which provides a ramp signal, here a current ramp $I_{slope}$.

The offset generator 100 provides, to the PWM modulator 94, the offset current $I_{bias}$ as a function of a difference between the input voltage $V_{in}$ and the output voltage $V_{out}$.

In detail, in this embodiment, the offset current $I_{bias}$ is proportional, in particular directly proportional, to the difference between the input voltage $V_{in}$ and the output voltage $V_{out}$.

The ramp generator 102 provides the current ramp $I_{slope}$ to the sum node 97. The current ramp $I_{slope}$ may have a fixed slope, for example, chosen by a user of the voltage regulator 50, or a variable slope, for example, variable in each cycle of the modulated signal PWM based on one or more parameters.

In this embodiment, the current ramp $I_{slope}$ has a slope that is a function of the difference between the input voltage $V_{in}$ and the output voltage $V_{out}$.

For instance, the slope of the current ramp $I_{slope}$ is proportional, in particular directly proportional, to the difference between the input voltage $V_{in}$ and the output voltage $V_{out}$.

With reference to FIG. 6, the feedback circuit 92 comprises a compensation module (e.g., circuit) 110, coupled to the output node 54 and to the reference node 52 and providing a control voltage $V_c$ as a function of the error signal $V_E$, and a voltage-to-current conversion module (e.g., circuit) 111, which provides the control current $I_C$ as a function of the control voltage $V_C$.

In detail, the compensation module 110 comprises an error amplifier, here an operational transconductance amplifier (OTA) 114 having an output 116, and a compensation network 118 coupled to the output 116.

In this embodiment, the compensation module 110 further comprises a voltage divider 120 coupled between the output node 54 and ground 78.

In detail, the voltage divider 120 has an intermediate node 121 and is formed by a series circuit here having two resistors 123 coupled together at the intermediate node 121.

The OTA 114 has a first input coupled to the reference node 52 and a second input coupled to the intermediate node 121 of the voltage divider 120.

In practice, in this embodiment, the OTA 114 compares the reference voltage $V_{ref}$ with a fraction of the output voltage $V_{out}$, depending on the values of resistance of the resistors 123.

In this embodiment, the compensation network 118 is of the second order and is coupled between the output 116 of the OTA 114 and ground 78.

In detail, the compensation network 118 is a parallel circuit coupled between the output node 116 and ground 78 and formed by a first branch, comprising a series circuit formed by a compensation resistor 124 and a first compensation capacitor 125, and a second branch comprising a second compensation capacitor 126.

However, the compensation network 118 may be formed by electrical elements different in number and type, according to the specific transfer function desired for the compensation module 110, i.e., to the trend of the control voltage $V_c$ as a function of the error signal $V_E$. For instance, the compensation network 118 may be of an order different from the second; for example, it may be of the first order, the third order, or a higher order.

The voltage-to-current conversion module 111 is formed by a first mirror branch 130 and a second mirror branch, here formed by a transistor 131 of the PMOS type.

The first mirror branch 130 is a series circuit coupled between ground 78 and a supply node 133 at a supply voltage $V_{CC}$ with respect to ground 78, and comprising a first transistor 135, here of the NMOS type, a second transistor 136, here of the PMOS type, and a control resistor 137 having a resistance $R_C$.

The first transistor 135 has a gate terminal coupled to the output 116 of the OTA 114, i.e., at the control voltage $V_C$.

The second transistor 136 has the source terminal connected to the supply node 133 and the gate terminal connected to the drain terminal.

Furthermore, the gate terminal of the second transistor 136 is connected to the gate terminal of the transistor 131.

The first mirror branch 130 generates an intermediate control current $I'_C$, as a function of the control voltage $V_C$.

The first and the second mirror branches 130, 131 have a current-mirror ratio 1:N, so that the loop control circuit 92 provides at output a control current $I_C$ equal to $N \cdot I'_C$.

The ratio 1:N between the first and the second mirror branches 130, 131 of the voltage-to-current conversion module 111 may be modified by varying the properties of the transistors 131, 136, for example, by appropriately sizing the transistors 131, 136 at the design stage.

The PWM modulator 94 comprises a comparator 140 having a positive input 141 and a negative input 142 and providing a comparison signal COMP, and a PWM generator 144 that generates the modulated signal PWM starting from the clock signal CLK and from the comparison signal COMP.

The PWM modulator 94 further comprises a first resistor 146 having a resistance $R_A$, coupled between the positive input 141 of the comparator 140 and a terminal of the shunt resistor 80, here connected to the common node 72 of the switching circuit 53; and a second resistor 147 having a resistance $R_B$, coupled between the negative input 142 of the comparator 140 and a second terminal of the shunt resistor 80, here connected to ground 78.

In the embodiment illustrated, the positive input 141 of the comparator 140 is coupled to an output of the sum node 97 and the negative input 142 of the comparator 140 is coupled to an output 149 of the offset generator 100.

The PWM generator 144 provides the modulated signal PWM. The modulated signal PWM has a period, which is a function of the period of duration T of the clock signal CLK, and a duty-cycle that is variable at each cycle (or period) of the modulated signal PWM.

Figure 8:
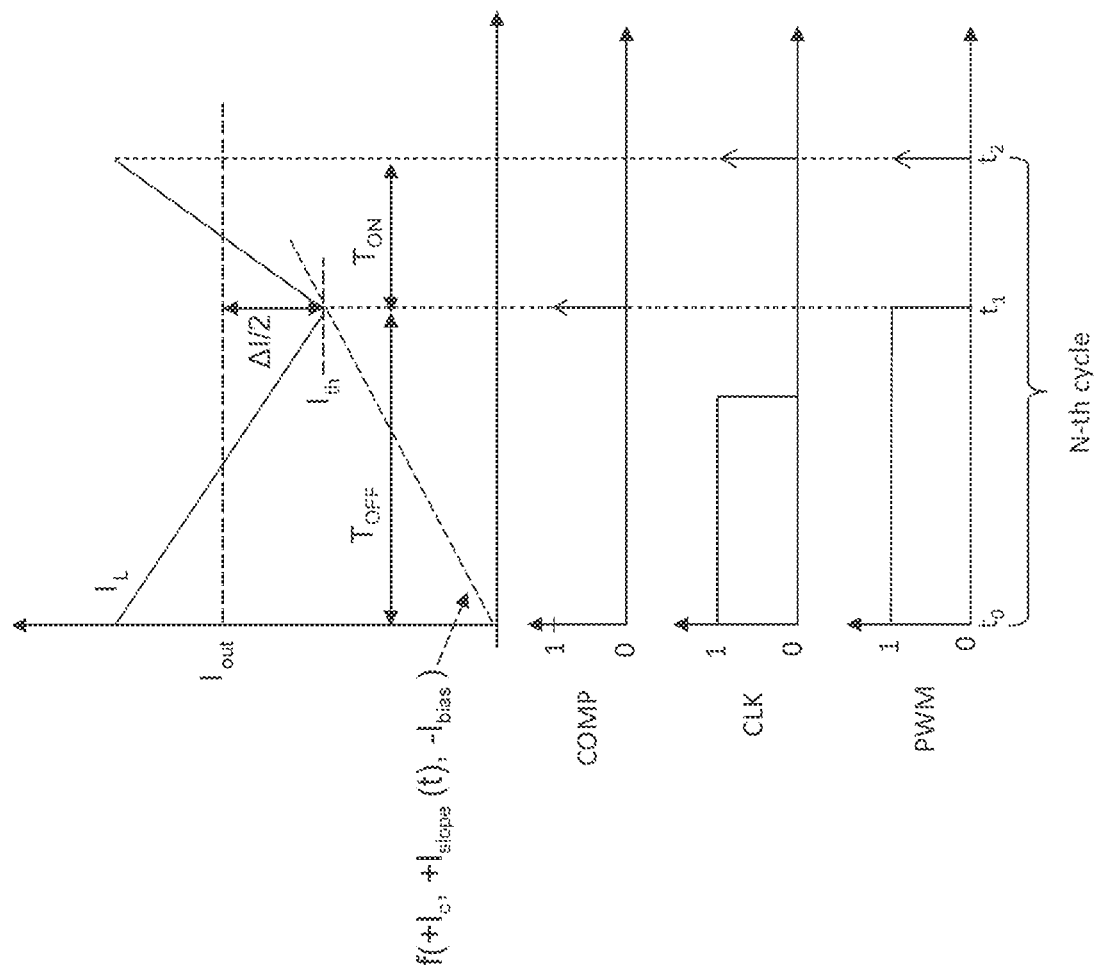
FIG. 8 shows an example of waveforms of the voltage regulator of FIG. 4, in use.

In this embodiment, as illustrated, for example, in the graph of FIG. 8, the period of the modulated signal PWM is fixed and equal to the period T of the clock signal CLK.

However, the period of the modulated signal PWM may be different from the period of the clock signal CLK; for example, it may be a multiple of the period of the clock signal CLK.

Furthermore, in this embodiment, the rising edges of the modulated signal PWM are temporally synchronized with the rising edges of the clock signal CLK.

In each cycle of the modulated signal PWM, the modulated signal PWM has a first half-period of duration $T_{OFF}$ and a second half-period of duration $T_{ON}$, such that $T = T_{ON} + T_{OFF}$.

The first half-period and the second half-period of the modulated signal PWM define an OFF phase and, respectively, an ON phase of the regulator 50.

The modulated signal PWM has, in the OFF phase, a first value, here a high logic value '1', and, in the ON phase, a second value, here a low logic value '0'.

The driving logic circuit 96 provides the switch-control signals T1, T2, T3, T4, in a per se known way, starting from the modulated signal PWM, as a function of the actual operating mode of the regulator 50, for example, the buck, boost, or buck-boost mode, and of the current-control mode used (for example, peak control or valley control).

FIG. 7 shows in detail the circuit diagram of an embodiment of the correction circuit 98.

The offset generator 100 comprises a first input portion 150 coupled to the input node 51; a second input portion 151 coupled to the output node 54; a current differential generator 152 coupled to the first and the second input portions 150, 151; and an output portion 153 coupled to the current differential generator 152 and providing the offset current $I_{bias}$ to the output node 149 of the offset generator 100.

The first input portion 150 is coupled between the input node 51 and ground 78 and comprises a series circuit formed by a resistor 154 having a resistance R and by a transistor 155, here of the NMOS type.

The source terminal of the transistor 155 is connected to ground 78. The drain terminal and the gate terminal of the transistor 155 are connected with each other.

In use, a current $(V_{in}-V_{gs1})/R$, where $V_{gs1}$ is the voltage between the gate terminal and the source terminal of the transistor 155, flows through the first input portion 150.

The second input portion 151 is coupled between the output node 54 and ground 78 and comprises a series circuit formed by a resistor 157 having a resistance R and by a transistor 158, here of the NMOS type.

The source terminal of the transistor 158 is connected to ground 78. The drain terminal and the gate terminal of the transistor 158 are connected with each other.

In use, a current $(V_{out}-V_{gs2})/R$, where $V_{gs2}$ is the voltage between the gate terminal and the source terminal of the transistor 158, flows through the second input portion 151.

In this embodiment, the resistors 154 and 157 have the same value of resistance R. However, the resistors 154, 157 may have values of resistance R different from one another, so as to generate a current that is not proportional to the difference between the input voltage $V_{in}$ and the output voltage $V_{out}$.

The current differential generator 152 comprises a first mirror portion 159A and a second mirror portion 159B mutually coupled in parallel between the supply node 133 and ground 78.

The first mirror portion 159A has a node 160 and comprises a transistor 161, here of the PMOS type, and a transistor 162, here of the NMOS type, mutually coupled in series at the node 160.

The second mirror portion 159B comprises a transistor 164, here of the PMOS type, and a transistor 165, here of the NMOS type, mutually coupled in series.

The gate terminal of the transistor 162 of the first mirror portion 159A is connected to the gate terminal of the transistor 155 of the first input portion 150.

The gate terminal of the transistor 165 of the second mirror portion 159B is connected to the gate terminal of the transistor 158 of the second input portion 151.

The gate terminal and the drain terminal of the transistor 164 are mutually connected and are connected to the gate terminal of the transistor 161.

The first and the second mirror portions 159A, 159B have a mirror ratio 1:1; however, the first and the second mirror portions 159A, 159B may have a different mirror ratio, according to the specific application.

The output portion 153 of the threshold-correction circuit 100 comprises a first transistor 167, here of a PMOS type, and a second transistor 168, here of a PMOS type.

The first transistor 167 has a source terminal connected to the supply node 133 and a drain terminal connected to the node 160 of the first mirror branch 159A of the current differential generator 152.

Furthermore, the drain terminal and the gate terminal of the first transistor 167 are mutually connected.

The second transistor 168 has a source terminal connected to the supply node 133 and a drain terminal forming the output 149 of the correction circuit 100.

The second transistor 168 has a gate terminal connected to the gate terminal of the first transistor 167.

The output portion 153 has a mirror factor $K_b$, between the first transistor 167 and the second transistor 168, which may be chosen according to the specific application, for example, by appropriately sizing the first and the second transistors 167, 168 at the design stage.

In practice, in use, a current $(V_{in}-V_{out})/R$ flows through the first transistor 167, towards the node 160, and the second transistor 168 mirrors on the output 149 the offset current $I_{bias}$, given by $K_b \cdot (V_{in}-V_{out})/R$.

The ramp generator 102 comprises an input portion, here formed by a transistor 170 of the PMOS type, a ramp circuit 171, and an output portion 172 providing the ramp current $I_{slope}$ to an output node 173 of the ramp circuit 102.

The transistor 170 has a source terminal connected to the supply node 133 and a gate terminal connected to the gate terminal of the first transistor 167 of the output portion of the offset generator 100.

In practice, the gate terminals of the transistors 167, 168 and 170 are at a same voltage $V_b$.

The input portion of the ramp generator 102 has a mirror factor m with respect to the first transistor 167 of the output portion of the offset generator 100. For instance, the mirror factor m may be regulated by modifying the dimensions of the transistors 167, 170 at the design stage.

The ramp circuit 171 comprises a transistor 174, here of the NMOS type, having the drain terminal and the gate terminal connected with each other and with the drain terminal of the transistor 170; and a parallel circuit coupled between the source terminal of the transistor 174 and ground 78 and formed by a capacitor 175 and a switch 176.

The switch 176 is controlled by a ramp-control signal CMD, which may be generated by the control device 55 as a function of the clock signal CLK or of the modulated signal PWM.

The output portion 172 of the ramp generator 102 comprises a first branch 180, coupled to the transistor 174, and a second branch, here formed by a transistor 181 of the PMOS type, forming the output node 173 of the ramp generator 102.

The first branch 180 is a series circuit coupled between the supply node 133 and ground 78 and comprises a first transistor 182, here of a PMOS type, a second transistor 183, here of an NMOS type, and a resistor 184 having a resistance $R_2$.

The second transistor 183 has a gate terminal connected to the gate terminal of the transistor 174 of the ramp circuit 171. The first transistor 182 has a gate terminal and a drain terminal connected with each other.

The transistor 181 has a source terminal connected to the supply node 133 and a gate terminal connected to the gate terminal of the first transistor 182.

In practice, the transistor 181 provides at output the ramp current $I_{slope}$, to the node 173 of the ramp generator 102.

In use, when the switch 176 is open, the ramp current $I_{slope}$ has an increasing trend in time given by $h \cdot (V_{in}-V_{out})/R \cdot t$, where h is a proportionality factor that may depend, for example, upon the mirror factor m, upon the dimensions of the transistors 181, 182, upon the resistance $R_2$ of the resistor 184, and upon the capacitance C of the capacitor 175.

In practice, in this embodiment, the ramp current $I_{slope}$ has a rising slope equal to $h \cdot (V_{in}-V_{out})/R$; i.e., the rising slope of the ramp current $I_{slope}$ is directly proportional to the difference between the input voltage $V_{in}$ and the output voltage $V_{out}$.

Described hereinafter, with reference to FIG. 8, is the operation of the regulator 50, when the regulator 50 is in the buck operating condition ($V_{in}>V_{out}$) and the control device 55 operates in a current control mode of the valley type.

In the buck mode with valley current control, in each cycle of the modulated signal PWM, the first half-period of duration $T_{OFF}$ temporally precedes the second half-period of duration $T_{ON}$. In practice, in each cycle of the modulated signal PWM, the ON phase of the regulator 50 follows the OFF phase.

In the ON phase, the driving logic circuit 96 provides the switch-control signals T1, T2, T3 and T4 so that the first high-side switch 68 and the second high-side switch 82 are closed, and the first low-side switch 69 and the second low-side switch 83 are open.

In the OFF phase, the driving logic circuit 96 provides the switch-control signals T1, T2, T3 and T4 so that the first high-side switch 68 and the second low-side switch 83 are open and the first low-side switch 69 and the second high-side switch 82 are closed.

In practice, during the ON phase, the inductor current $I_L$ that flows through the inductor 87 follows a current path $I_{ON}$, indicated by a dashed arrow in FIG. 5, from the input node 51 to the output node 54. During the OFF phase, the inductor current $I_L$ that flows through the inductor 87 follows a current path $I_{OFF}$, indicated by a dashed-and-dotted arrow in FIG. 5, from ground 78 to the output node 54.

At the start of an N-th cycle of the modulated signal PWM, instant $t_0$, i.e., here at a rising edge of the clock signal CLK, the regulator 50 is in the OFF phase.

During the OFF phase, the inductor current $I_L$ flows from ground 78 through the shunt resistor 80 towards the common node 72.

During the OFF phase, the inductor current $I_L$ decreases in time with a trend that is, to a first approximation, linear and with a slope equal to $-V_{out}/L$.

During the OFF phase, the signal CMD keeps the switch 176 open.

With reference to the instant $t_0$ wherein the N-th cycle starts, the ramp current $I_{slope}$ may be expressed by the formula $I_{slope}=h \cdot (V_{in}-V_{out})/R \cdot (t-t_0)$, where $t_0$ is the instant when the N-th cycle starts.

With reference to FIG. 6, during the OFF phase, a voltage V+ drops on the positive input 141 of the comparator 140 with respect to ground 78, given by:

$$V+=-I_L \cdot R_s+R_A \cdot (N \cdot I'_c+I_{slope})$$

and a voltage V− drops on the negative input 142 of the comparator 140 with respect to ground 78, given by:

$$V-=I_{bias} \cdot R_B.$$

When the voltage V+ becomes equal to the voltage V− (instant $t_1$ in FIG. 8), the comparator 140 triggers and switches the comparison signal COMP. In response, the PWM generator 144 switches the modulated signal PWM, here to the low value '0'. The regulator 50 enters the ON phase.

The time interval between the instant $t_1$ and the instant $t_0$ determines the duration $T_{OFF}$ of the OFF phase of the regulator 50.

During the ON phase, i.e., between the instants $t_1$ and $t_2$, the inductor current $I_L$ increases in time with a trend that is, to a first approximation, linear and with a slope proportional to $(V_{in}-V_{out})/L$.

The ramp generator 102 may be designed so that, during the OFF phase, the rising slope of the ramp current $I_{slope}$ is higher than or equal to half of the slope of the inductor current $I_L$ during the next ON phase; for example, by modifying the proportionality factor h and/or the resistance R at the design stage.

The signal CMD may drive closing of the switch 176 when the ON phase of the N-th cycle of the regulator 50 starts, or else during the ON phase of the N-th cycle of the regulator 50, for example, in the proximity of the end of the N-th cycle of the regulator 50.

The instant at which the signal CMD drives closing of the switch 176 may be chosen as a function of the discharge time of the capacitor 175, for example, so that at the start of the next N+1-th cycle the capacitor 176 is completely discharged.

In the following discussion, the inductor current $I_L$ such that, at the instant $t_1$ of the N-th cycle, the voltages V+ and V− have the same value is referred to as threshold current $I_{th}$.

Thus, at the instant $t_1$, we have $V+(t_1)=V-(t_1)$, i.e.:

$$-I_{th} \cdot R_s+R_A \cdot (N \cdot I'_c+I_{slope}(T_{OFF}))=R_B \cdot I_{bias}.$$

Consequently, at the instant $t_1$ when the modulated signal PWM passes from the OFF phase to the ON phase, it may be written:

$$I_{th} = \frac{R_A \cdot N \cdot I'_c + R_A \cdot I_{slope}(T_{OFF}) - R_B \cdot I_{bias}}{R_s} \quad (1)$$

and $$I'_c = \frac{R_s \cdot I_{th} + R_B \cdot I_{bias} - R_A \cdot I_{slope}(T_{OFF})}{N \cdot R_A} \quad (2)$$

In practice, the threshold current $I_{th}$ that determines passage from the OFF phase to the ON phase in the N-th cycle is a function of the control current $I_C$, of the ramp current $I_{slope}$, and of the offset current $I_{bias}$.

The control voltage $V_c$ may be represented by the formula $V_c=I_c \cdot R_c+V_{gs}$, where $V_{gs}$ is the gate-to-source voltage of the transistor 135 and $R_c$ is the resistance of the resistor 137 (FIG. 6).

In addition (FIG. 8), the output current $I_{out}$ provided at the output node 54 to the load 58 may be indicated as the mean value of the inductor current $I_L$ during the N-th cycle according to the relation $I_{out}=I_{th}+\Delta I/2$, wherein $\Delta I/2$ may in turn be expressed, in a per se known manner, by the formula:

$$\frac{\Delta I}{2} = \frac{(V_{in}-V_{out}) \cdot V_{out}/V_{in}}{2L \cdot f_{sw}} = I_{out} - I_{th} \quad (3)$$

wherein $V_{out}/V_{in}$ is the duty-cycle of the modulated signal PWM in the N-th cycle, and $f_{sw}$ is the frequency of the modulated signal PWM, i.e., here equal to 1/T.

Thus, by combining the formula of the control voltage $V_C$ with the equations (2) and (3), it may be obtained:

$$V_c = I_{out}\frac{R_C \cdot R_s}{R_A \cdot N} + R_C \frac{-\Delta I/2 \cdot R_s + R_B \cdot I_{bias} - R_A \cdot I_{slope}(T_{OFF})}{N \cdot R_A}+V_{gs} \quad (4)$$

In practice, the presence of the offset current $I_{bias}$ allows to compensate the reduction of the dynamic interval of the control voltage $V_c$ caused by the ramp current $I_{slope}$ and by the current oscillation $\Delta I$.

In detail, the fact that both the offset current $I_{bias}$ and the slope of the ramp current $I_{slope}$ are each a function of a difference between the input voltage $V_{in}$ and the output voltage $V_{out}$ allows to improve the dynamic interval of the control voltage $V_c$.

Furthermore, the Applicant has found that the fact that both the offset current $I_{bias}$ and the slope of the ramp current $I_{slope}$ are proportional, in particular directly proportional, to the difference between the input voltage $V_{in}$ and the output voltage $V_{out}$ allows to further improve the dynamic interval of the control voltage $V_c$.

Figure 2:
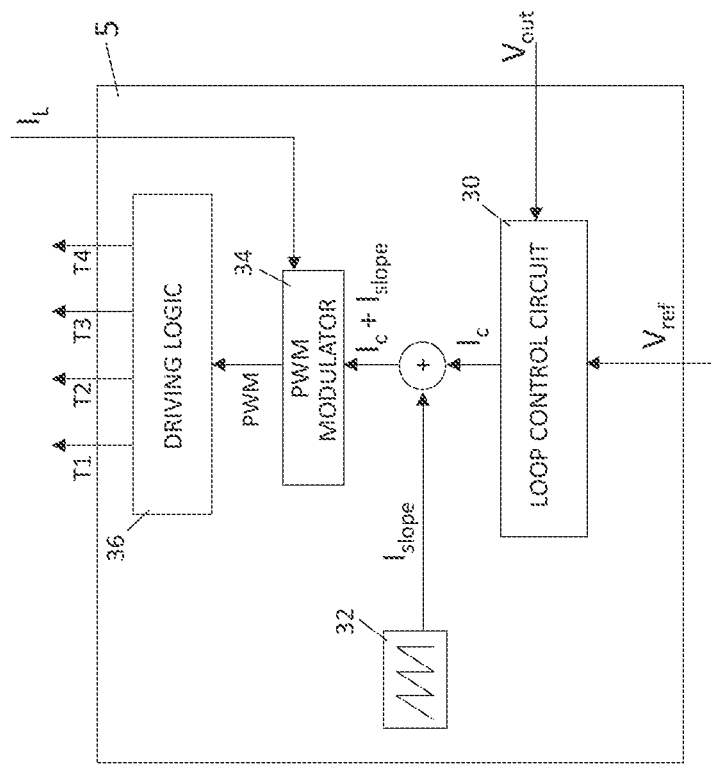
FIGS. 1 and 2 show block diagrams of a known switching voltage regulator.
Figure 1:
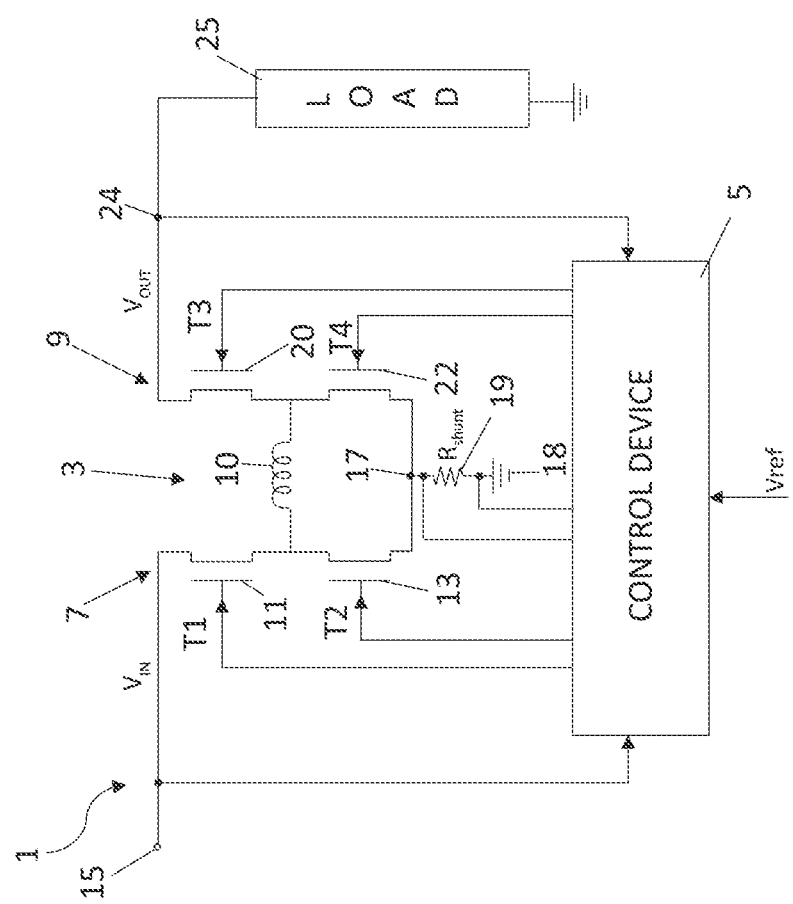
Figure 3:
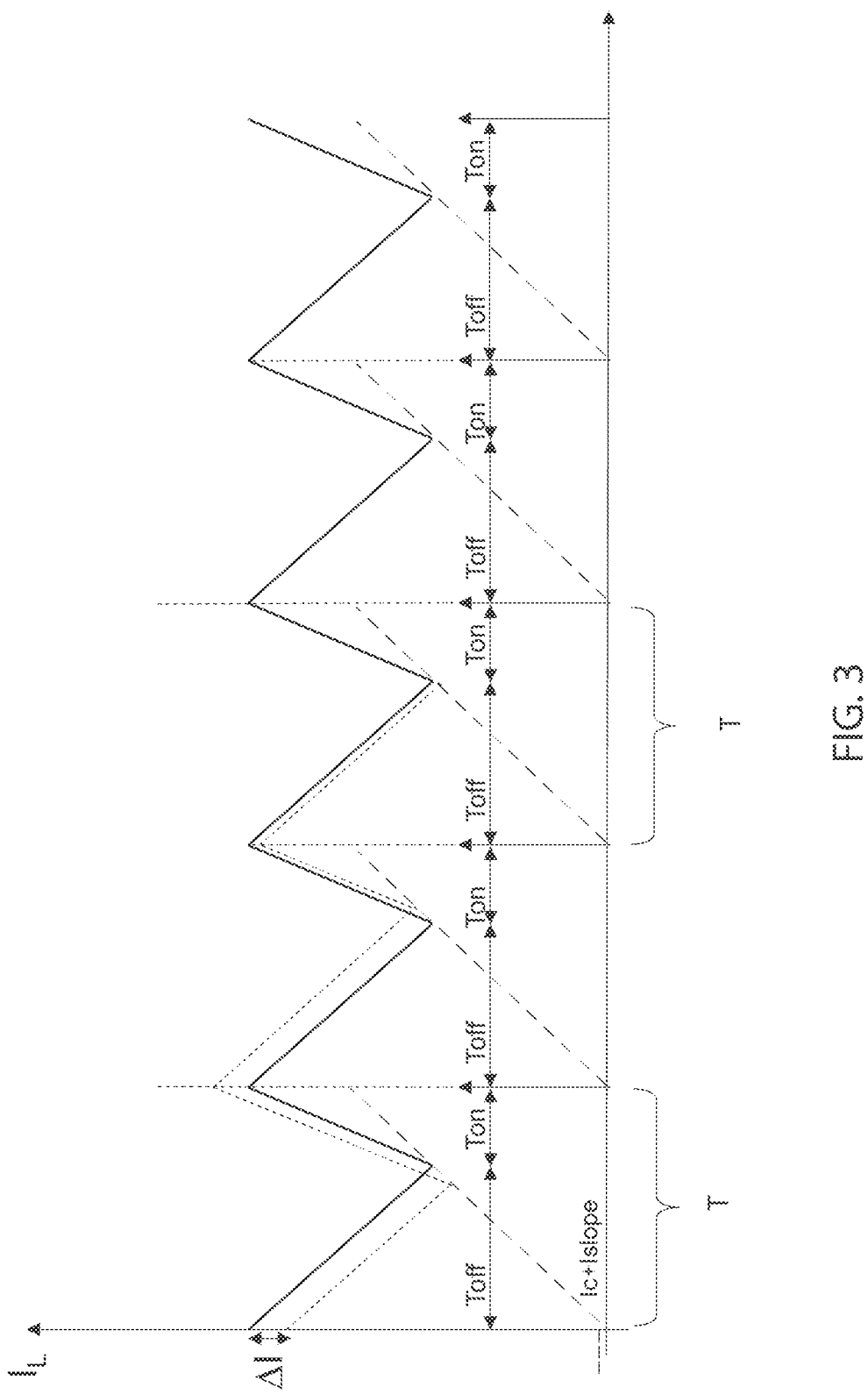
FIG. 3 shows waveforms of the known regulator of FIGS. 1 and 2, in use.
Figure 9:
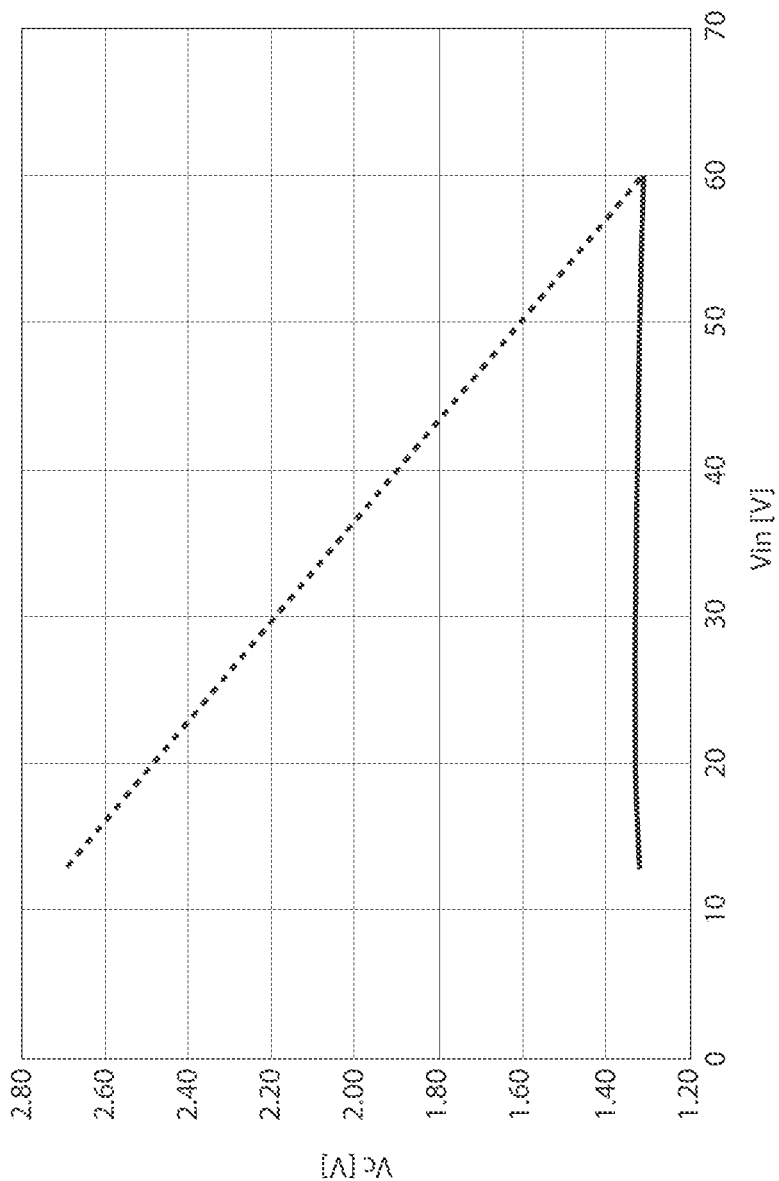
FIGS. 9-11 provide a comparison between the trend of quantities of the regulator of FIG. 4 and of the known regulator of FIG. 2.
Figure 10:
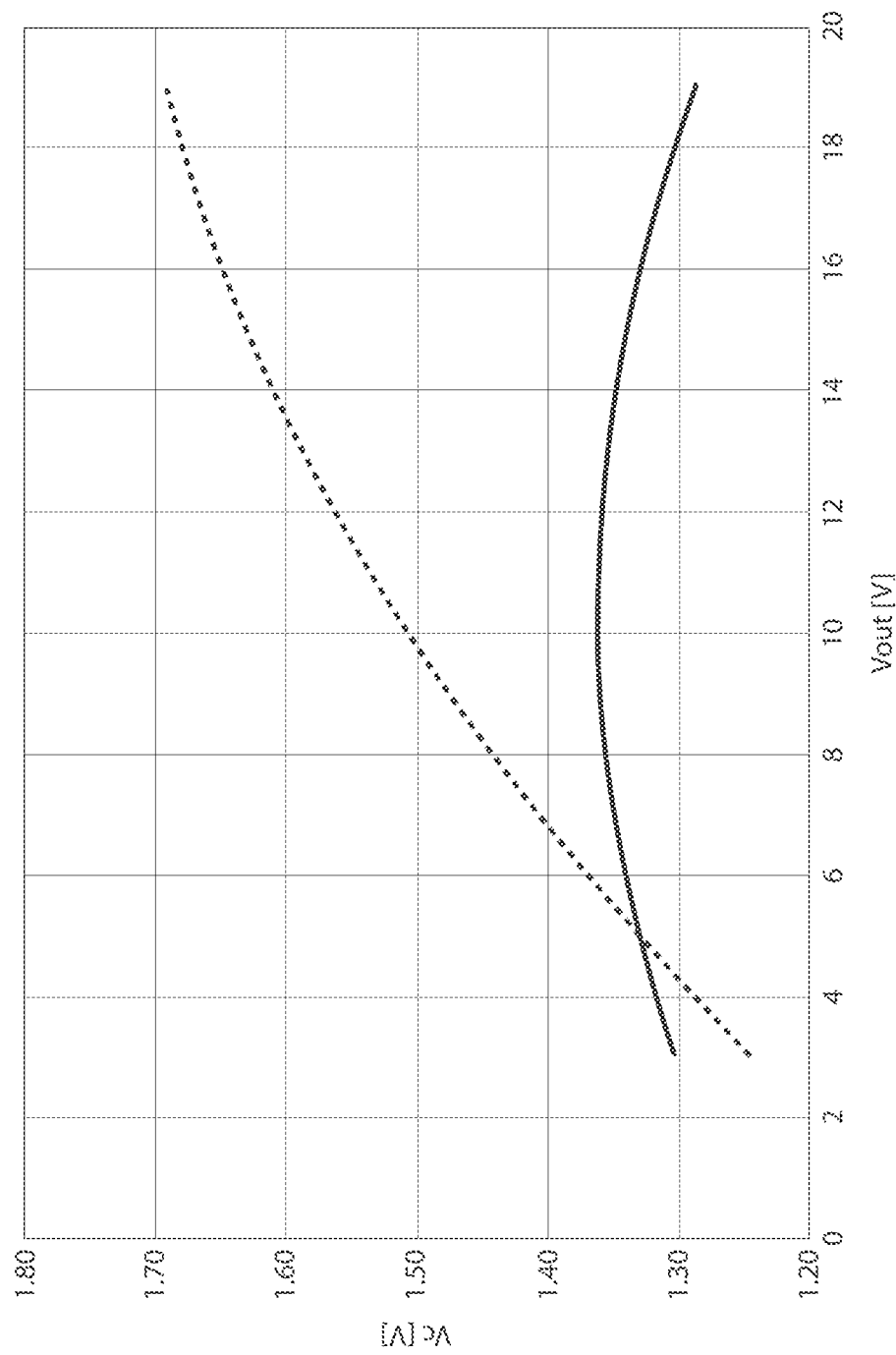
Figure 11:
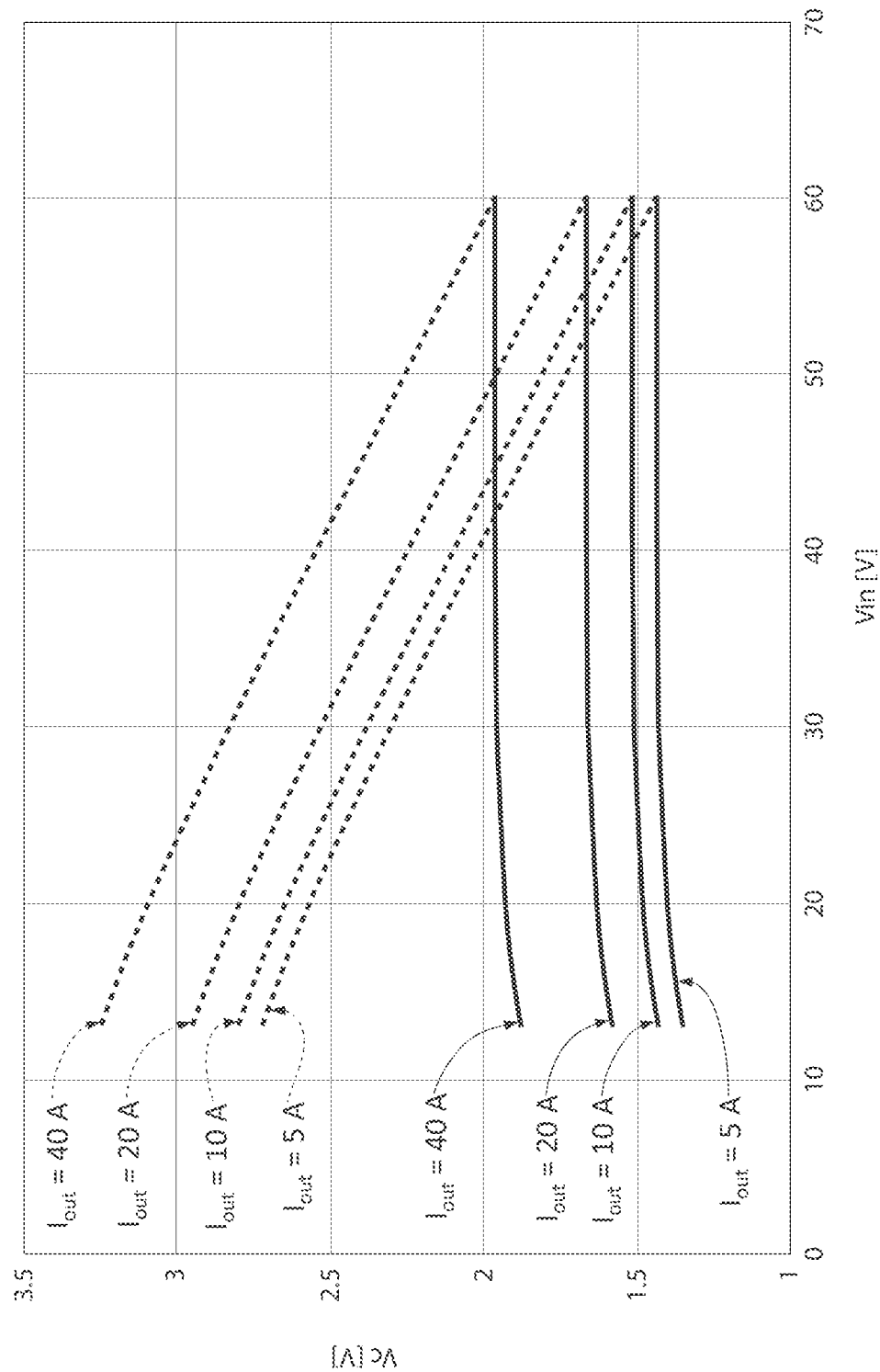

FIGS. 9-11 show the trend of the control voltage $V_C$ of the regulator 50 in comparison with the trend of the voltage $V_C$ of the known regulator 1 of FIGS. 1 and 2, as a function of the output voltage $V_{out}$, of the input voltage $V_{in}$ and of the output current $I_{out}$.

In detail, FIG. 9 shows an example of the trend of the control voltage $V_C$ as the input voltage $V_{in}$ varies, with output current $I_{out}$ equal to 2 A and output voltage $V_{out}$ equal to 5 V, both for the known regulator 1 (dashed line) and for the regulator 50 (solid line).

As may be noted, the regulator 50 allows to obtain an approximately constant trend of the control voltage $V_c$ as a function of the input voltage $V_{in}$, whereas the control voltage $V_c$ of the known regulator 1 has a high dependence upon the input voltage $V_{in}$.

FIG. 10 shows an example of the trend of the control voltage $V_C$ as the output voltage $V_{out}$ varies, with output current $I_{out}$ equal to 2 A and input voltage $V_{in}$, equal to 20 V, both for the known regulator 1 (dashed line) and for the regulator 50 (solid line). As may be noted, the regulator 50 allows to obtain a lower variability of the control voltage $V_C$ as a function of the output voltage $V_{out}$, as compared to the known regulator 1.

FIG. 11 shows examples of the trend of the control voltage $V_C$ as the input voltage $V_{in}$ varies, at different values of the output current $I_{out}$ (5 A, 10 A, 20 A and 40 A) both for the known regulator 1 (dashed lines) and for the regulator 50 (solid lines).

The control voltage $V_C$ of the regulator 50 and of the known regulator 1 depend upon the output current $I_{out}$; in fact, both the regulator 50 and the known regulator 1 are current-controlled. However, the regulator 50 allows to eliminate, to a first approximation, the dependence of the control voltage $V_C$ upon the input voltage $V_{in}$, even at different values of the output current $I_{out}$.

The fact that the control voltage $V_C$ of the control device 55 has a low dependence upon the input voltage $V_{in}$, allows the control device 55, given the same loop gain, to function properly in a more extensive range of input voltages $V_{in}$ and at higher values of output current $I_{out}$ than those of the known control device 5.

Furthermore, the low dependence of the control voltage $V_C$ upon the input voltage $V_{in}$ means that, even in the presence of a step of the input voltage $V_{in}$, for example, even of some tens of volts, a smaller variation of the control voltage $V_C$ is necessary to keep the output voltage $V_{out}$ at the reference value $V_{ref}$.

Consequently, the control device 55 allows to obtain a shorter response time in response to a variation of the input voltage Vin, as compared to the known control device 5.

Finally, it is clear that modifications and variations may be made to the control device 55 and to the regulator 50 described and illustrated herein, without thereby departing from the scope of the present disclosure.

The offset generator 100 and the ramp generator 102 may be separate from one another.

For instance, the ramp generator 102 may not be controlled by the voltage $V_b$ by the correction circuit 100, and may receive directly the input voltage $V_{in}$ and the output voltage $V_{out}$ (as shown by dashed arrows in FIG. 4).

For instance, the offset generator 100 may generate the offset current $I_{bias}$ in a way different from what has been illustrated.

For example, the offset current $I_{bias}$ may have a different dependence upon the input voltage $V_{in}$ and the output voltage $V_{out}$, for example, a nonlinear dependence.

As an alternative, the offset current $I_{bias}$ may be a function just of the input voltage $V_{in}$ or of the output voltage $V_{out}$.

In addition or as an alternative, the ramp generator 102 may generate the ramp current $I_{slope}$ in a way different from what has been illustrated. For instance, the rising slope of the ramp current $I_{slope}$ may be independent of the input voltage $V_{in}$ and the output voltage $V_{out}$; for example, it may have a constant value chosen by a user according to the specific application, or else it may have a different dependence, for example, a nonlinear dependence, upon the difference between the input voltage $V_{in}$ and the output voltage $V_{out}$.

For example, the comparator 140 may be configured to trigger when the voltage V+ is equal to the voltage V− plus or minus a threshold value, which may be chosen at the design stage according to the specific application.

For instance, the control device 55 may use a control mode different from the valley type discussed with reference to FIG. 8; for example, it may use a control mode of a peak type in the buck mode.

Furthermore, even though with reference to FIG. 8 the operation of the control device 55 has been described in reference to the buck mode with valley control, the control device 55 may be used also in the boost and buck-boost modes, with control of a valley type, a peak type, or other modes per se known. In this regard, the control device 55 may comprise a mode detector 180 (represented by a dashed line in FIG. 4), configured to compare the input voltage $V_{in}$ and the output voltage $V_{out}$ (or, alternatively, the input voltage $V_{in}$ and the output voltage $V_{out}$), and provide in response a mode signal MOD indicative of the mode (buck, boost, or buck-boost) of the regulator For instance, the driving logic 96 may generate the switch-control signals T1, T2, T3 and T4, starting from the modulated signal PWM, as a function of the mode signal MOD.

For example, the PWM modulator 94 may generate the modulated signal PWM also as a function of the mode signal MOD.

For instance, the voltage-to-current conversion module 111 may comprise a current-limited mirror, so that the control current $I_C$ provided at output is lower than or equal to a maximum value, which may be chosen as a function of a desired maximum current flowing through the switching circuit 53.

The loop-control circuit 92, the PWM modulator 94, the driving logic 96, and the threshold-correction module 98 are modules that may be made as analog circuits, digital circuits, or mixed-signal circuits, according to the specific application.

For instance, the present regulator may be configured to operate only in the buck mode ($V_{in}>V_{out}$) or in the boost mode ($V_{in}<V_{out}$).

Figure 12:
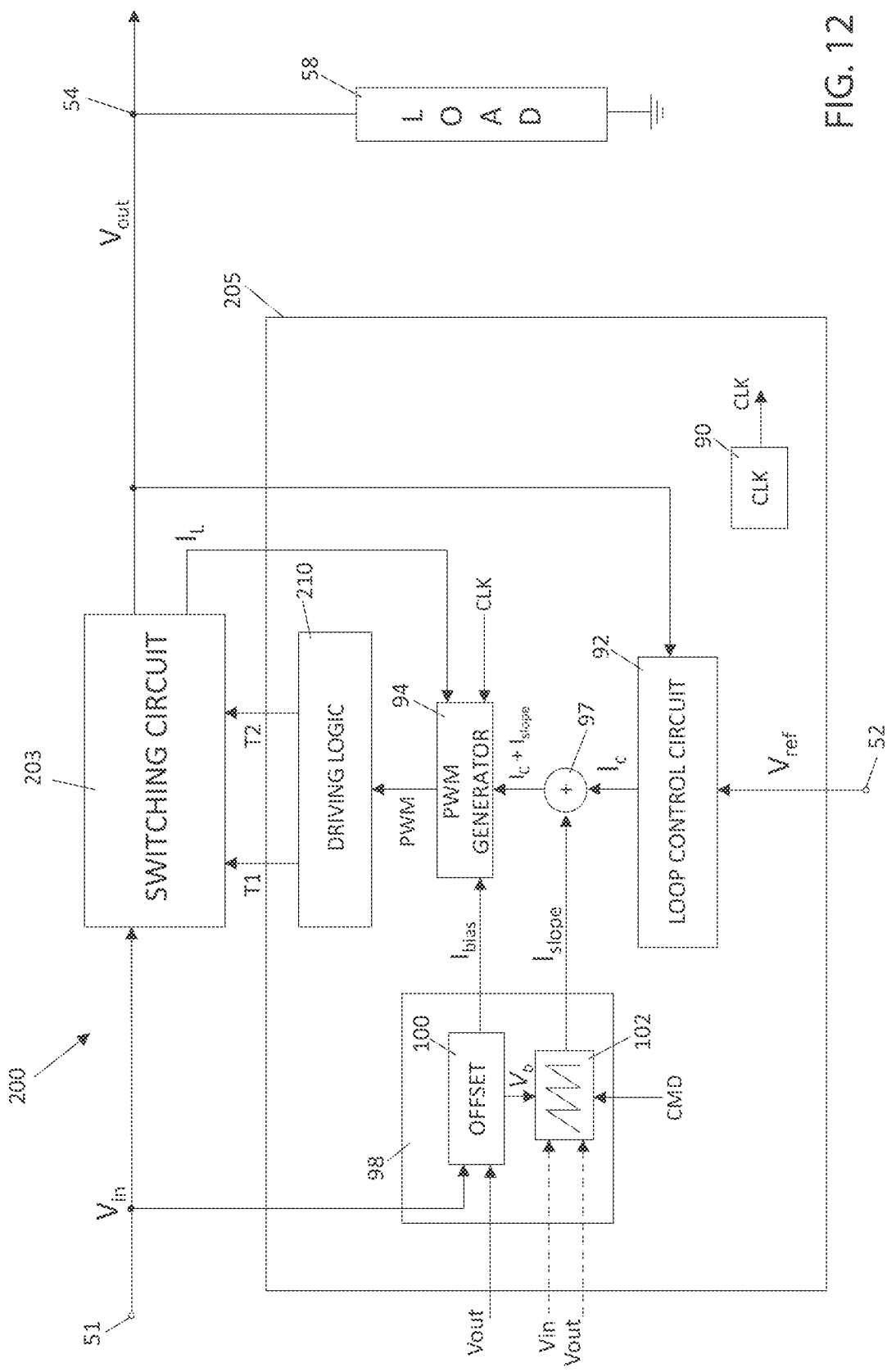
FIG. 12 shows a block diagram of a different embodiment of the present voltage regulator comprising a switching circuit and a control device.

FIG. 12 shows a different embodiment of the present regulator, here designated by 200, configured to operate only in buck mode. The regulator 200 comprises a switching circuit, here designated by 203, and a control device, here designated by 205.

Figure 13:
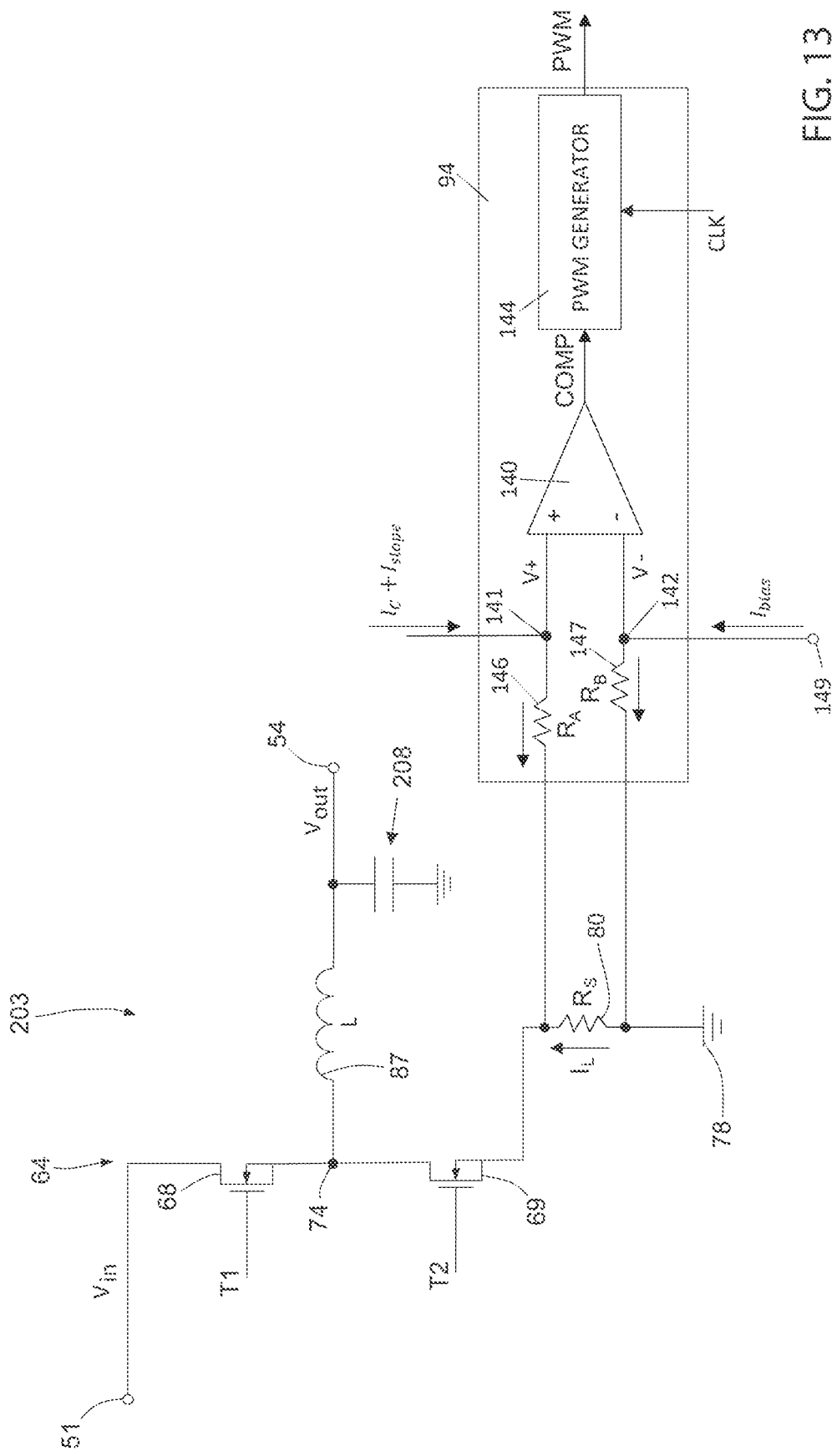
FIG. 13 shows a circuit diagram of the switching circuit and of a portion of the control device of the voltage regulator of FIG. 12, according to an embodiment.

As illustrated in detail in FIG. 13, the switching circuit 203 is formed only by the first half bridge 64.

In practice, in this embodiment, the inductor 87 has a first terminal coupled to the intermediate node 74 of the first half bridge 64 and a second terminal directly coupled to the output node 54.

The regulator 200 also comprises an output capacitor 208, coupled between the output node 54 and ground 78.

The control device 205 has a structure similar to that of the control device 55 of FIG. 4; consequently, elements in common are designated by the same reference numbers and are not described any further.

In detail, unlike the control device 55 of FIG. 4, in the control device 205 of FIG. 12, the driving logic circuit, here designated by 210, provides only the first and the second switch-control signals T1, T2 to the switching circuit 203, starting from the modulated signal PWM.

According to a different embodiment, the control device 55, 205 may receive the inductor current $I_L$ directly from one of the switches of the switching circuit 53, 203, in particular in the case wherein the control device and the switching circuit are integrated in the same die.

Figure 14:
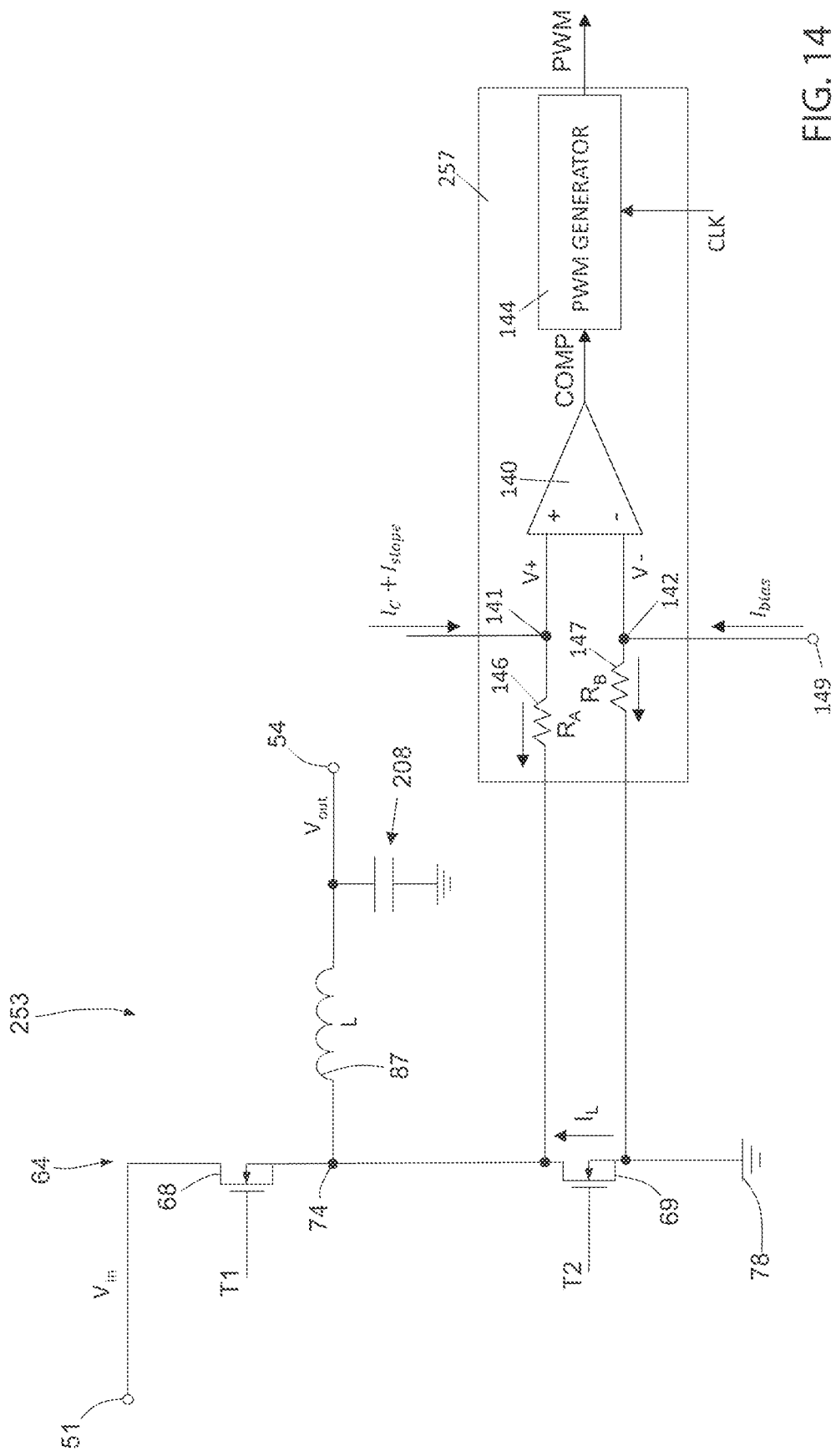
FIG. 14 shows a circuit diagram of the switching circuit and of a portion of the control device of the voltage regulator of FIG. 12, according to a different embodiment.

For instance, as illustrated in FIG. 14 for the regulator 200 of FIG. 13, the PWM modulator, here designated by 257, may be coupled directly to the first low-side switch 69 of the switching circuit, here designated by 253.

In practice, the switching circuit 253 does not comprise a dedicated shunt resistor, and the comparator 140 of the PWM modulator 257 uses the ON-state resistance $R_{ds}$ of the low-side switch 69 as resistive element for detecting the current that flows in the switching circuit 253.

The use of one of the switches of the switching circuit as resistive element for detecting the current that flows in the switching circuit enables reduction of the energy consumption of the voltage regulator.

The embodiments described and illustrated herein may be combined to form further solutions.

A control device (55; 205) for a switching voltage regulator (50; 200) may be summarized as including a switching circuit (53; 203; 253), the control device being configured to receive an input voltage ($V_{in}$) and an output voltage ($V_{out}$) of the switching circuit and a measurement signal indicative of a current ($I_L$) that flows in the switching circuit, the control device including: a feedback module (92) configured to detect an error signal ($V_E$) indicative of a difference between the output voltage ($V_{out}$) and a nominal voltage ($V_{ref}$), and to provide a control signal ($I_c$) as a function of the error signal; a threshold-correction module (98, 100, 102) configured to provide an offset signal ($I_{bias}$) and a ramp signal ($I_{slope}$); and a driving-signal generation module (94, 96; 94, 210; 257) coupled to the feedback module and to the threshold-correction module and configured to receive the measurement signal, to compare the measurement signal with a threshold ($I_{th}$) and, in response, to provide a modulated signal (PWM, T1, T2, T3, T4; T1, T2) for driving the switching circuit, the threshold being a function of the control signal, of the offset signal, and of the ramp signal, characterized in that the threshold-correction module (98, 100) may be configured to provide the offset signal as a function of the input voltage ($V_{in}$) and/or of the output voltage ($V_{out}$).

The threshold-correction module (100) may be configured to provide the offset signal as a function of a difference between the input voltage and the output voltage.

The offset signal ($I_{slope}$) may be proportional to the input voltage and to the output voltage.

The switching circuit (53; 203; 253) may include a resistive element (80; 69), the driving-signal-generation module (94, 96; 94, 210; 257) including a comparator (140) having a first input (141) configured to be coupled to a first terminal of the resistive element, and a second input (142) configured to be coupled to a second terminal of the resistive element, the comparator being configured to receive the control signal ($I_C$) and the ramp signal ($I_{slope}$) at the first input, and the offset signal ($I_{bias}$) at the second input.

The feedback module (92) may include a compensation module (110) and a voltage-to-current conversion module (111), the compensation module being configured to generate a control voltage ($V_c$) starting from the error signal ($V_E$), the voltage-to-current conversion module being configured to generate the control signal starting from the control voltage ($V_c$).

The ramp signal may have a slope, the threshold-correction module (98, 102) being configured to modify the slope of the ramp signal as a function of the input voltage and/or of the output voltage.

The ramp signal may have a slope, the threshold-correction module being configured to modify the slope of the ramp signal as a function of a difference between the input voltage and the output voltage.

The threshold-correction module may include an offset generator (100) and a ramp generator (102) coupled to the offset generator, the offset generator being configured to provide the offset signal, starting from the input voltage and the output voltage, and a slope-control signal ($V_b$) indicative of a difference between the input voltage and the output voltage, the ramp generator (102) being configured to generate the ramp signal starting from the slope-control signal.

A switching voltage regulator (50; 200) may be summarized as including the control device (55; 205) discussed above and the switching circuit (53; 203; 253), the switching circuit including at least one half bridge (64, 65) and an inductor (87) coupled to an intermediate node (74, 85) of the half bridge, the half bridge comprising a first and a second switch (68, 69, 82, 83) coupled in series between a connection node (51, 54) and a common-reference potential node (72; 78), wherein the first and the second switches may be controlled, respectively, by a first switch-control signal and a second switch-control signal (T1, T2, T3, T4) generated by the driving-signal generation module (94, 96; 94, 210) starting from the modulated signal (PWM).

The connection node may be an input node (51), configured to receive the input voltage ($V_{in}$), the at least one half bridge being a first half bridge (64), the switching circuit further including a second half bridge (65) including a third and a fourth switch (82, 83) coupled in series between an output node (54), configured to provide the output voltage ($V_{out}$), and the common-reference potential node, the inductor being coupled between intermediate nodes (74, 85) of the first and the second half bridges, wherein the first, the second, the third, and the fourth switches may be controlled, respectively, by a first, a second, a third, and a fourth switch-control signal (T1, T2, T3, T4) generated by the driving-signal generation module (94, 96) starting from the modulated signal (PWM).

A control method for a switching voltage regulator (50; 200) may be summarized as including a switching circuit (53; 203; 253) and a control device (55; 205) and configured to receive an input voltage ($V_{in}$) and to provide an output voltage ($V_{out}$), the control method including: detecting an error signal ($V_E$) indicative of a difference between the output voltage ($V_{out}$) and a nominal voltage ($V_{ref}$); providing a control signal ($I_c$) as a function of the error signal; providing a ramp signal ($I_{slope}$); providing an offset signal ($I_{bias}$); receiving a measurement signal indicative of a current ($I_L$) that flows in the switching circuit; comparing the measurement signal with a threshold ($I_{th}$), wherein the threshold may be a function of the control signal, of the offset signal, and of the ramp signal; and providing a modulated signal (PWM, T1, T2, T3, T4) for driving the switching circuit, in response to the comparison between the measurement signal and the threshold, characterized in that the offset signal may be a function of the input voltage ($V_{in}$) and/or of the output voltage ($V_{out}$).

The offset signal may be a function of a difference between the input voltage and the output voltage.

The offset signal may be proportional to the input voltage and to the output voltage.

The ramp signal may have a slope that is a function of a difference between the input voltage and the output voltage and/or is proportional to the input voltage and to the output voltage.

The modulated signal (PWM) may have a period (T) having a duty-cycle, the method including modifying the duty-cycle of the modulated signal in response to the comparison between the measurement signal and the threshold.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for a switching voltage regulator, wherein the switching voltage regulator includes a switching circuit configured to receive an input voltage and output an output voltage,
wherein the control device is configured to receive the input voltage, the output voltage and a measurement signal indicative of a current that flows in the switching circuit, and
wherein the control device comprises:
  a feedback stage configured to:
    detect an error signal indicative of a difference between the output voltage and a nominal voltage; and
    provide a control signal as a function of the error signal;
  a threshold correction stage configured to provide an offset signal and a ramp signal; and
  a driving signal generation stage coupled to the feedback stage and the threshold correction stage and configured to:
    receive the measurement signal;
    compare the measurement signal with a threshold, the threshold being a function of the control signal, the offset signal and the ramp signal; and
    in response to comparing the measurement signal with the threshold, provide a modulated signal for driving the switching circuit,
  wherein the threshold correction stage is configured to provide the offset signal as a function of the input voltage or the output voltage.

2. The control device according to claim 1, wherein the threshold correction stage is configured to:
  provide the offset signal as a function of a difference between the input voltage and the output voltage.

3. The control device according to claim 1, wherein the offset signal is proportional to the input voltage and the output voltage.

4. The control device according to claim 1, wherein the switching circuit includes a resistive element, wherein the driving signal generation stage includes a comparator having a first input configured to be coupled to a first terminal of the resistive element and a second input configured to be coupled to a second terminal of the resistive element, and wherein the comparator is configured to receive the control signal and the ramp signal at the first input and the offset signal at the second input.

5. The control device according to claim 1, wherein the feedback stage includes a compensation stage and a voltage-to-current conversion stage, wherein the compensation stage is configured to generate a control voltage based on the error signal, and wherein the voltage-to-current conversion stage is configured to generate the control signal starting from the control voltage.

6. The control device according to claim 1, wherein the ramp signal has a slope, and the threshold correction stage is configured to modify the slope of the ramp signal as a function of the input voltage or the output voltage.

7. The control device according to claim 1, wherein the ramp signal has a slope, and the threshold correction stage is configured to modify the slope of the ramp signal as a function of a difference between the input voltage and the output voltage.

8. The control device according to claim 1, wherein the threshold correction stage includes an offset generator and a ramp generator coupled to the offset generator, wherein the offset generator is configured to provide the offset signal, based on the input voltage and the output voltage, and a slope control signal indicative of a difference between the input voltage and the output voltage, and wherein the ramp generator is configured to generate the ramp signal based on the slope control signal.

9. A switching voltage regulator, comprising:
  a switching circuit configured to receive an input voltage and output an output voltage, wherein the switching circuit includes:
    at least one half bridge having an intermediate node and first and second switches that are coupled in series between a connection node and a common reference potential node, wherein the first and second switches are controlled, respectively, by a first switch control signal and a second switch control signal; and
    an inductor coupled to the intermediate node; and
  a control device including:
    a feedback stage configured to:
      detect an error signal indicative of a difference between the output voltage and a nominal voltage; and
      provide a control signal as a function of the error signal;
    a threshold correction stage configured to provide an offset signal and a ramp signal; and
    a driving signal generation stage coupled to the feedback stage and the threshold correction stage and configured to:
      receive a measurement signal indicative of a current that flows in the switching circuit;
      compare the measurement signal with a threshold, the threshold being a function of the control signal, the offset signal and the ramp signal;
      in response to comparing the measurement signal with the threshold, provide a modulated signal for driving the switching circuit; and
      generate the first switch control signal and the second switch control signal based on the modulated signal,
  wherein the threshold correction stage is configured to provide the offset signal as a function of the input voltage or the output voltage.

10. The switching voltage regulator according to claim 9, wherein:
  the connection node is an input node configured to receive the input voltage,
  the at least one half bridge is a first half bridge, the switching circuit includes a second half bridge including third and fourth switches coupled in series between an output node configured to provide the output voltage and the common reference potential node, the inductor is coupled between intermediate nodes of the first and the second half bridges, the third and fourth switches are controlled, respectively, by third and fourth switch control signals generated by the driving signal generation stage based on the modulated signal.

11. The switching voltage regulator according to claim 9, wherein the threshold correction stage is configured to:

provide the offset signal as a function of a difference between the input voltage and the output voltage.

12. The switching voltage regulator according to claim 9, wherein the offset signal is proportional to the input voltage and the output voltage.

13. The switching voltage regulator according to claim 9, wherein the switching circuit includes a resistive element, wherein the driving signal generation stage includes a comparator having a first input configured to be coupled to a first terminal of the resistive element and a second input configured to be coupled to a second terminal of the resistive element, and wherein the comparator is configured to receive the control signal and the ramp signal at the first input and the offset signal at the second input.

14. The switching voltage regulator according to claim 9, wherein the feedback stage includes a compensation stage and a voltage-to-current conversion stage, wherein the compensation stage is configured to generate a control voltage based on the error signal, and wherein the voltage-to-current conversion stage is configured to generate the control signal starting from the control voltage.

15. The switching voltage regulator according to claim 9, wherein the ramp signal has a slope, and the threshold correction stage is configured to modify the slope of the ramp signal as a function of the input voltage or the output voltage.

16. A method for controlling a switching voltage regulator:

detecting an error signal indicative of a difference between an output voltage of the switching voltage regulator and a nominal voltage;

providing a control signal as a function of the error signal;

providing a ramp signal;

providing an offset signal;

receiving a measurement signal indicative of a current that flows in a switching circuit of the switching voltage regulator;

comparing the measurement signal with a threshold, wherein the threshold is a function of the control signal, the offset signal and the ramp signal; and providing a modulated signal for driving the switching circuit, in response to the comparing the measurement signal with the threshold, wherein the offset signal is a function of an input voltage of the switching voltage regulator or the output voltage of the switching voltage regulator.

17. The method according to claim 16, wherein the offset signal is a function of a difference between the input voltage and the output voltage.

18. The method according to claim 16, wherein the offset signal is proportional to the input voltage and to the output voltage.

19. The method according to claim 16, wherein the ramp signal has a slope that is a function of a difference between the input voltage and the output voltage or is proportional to the input voltage and to the output voltage.

20. The method according to claim 16, wherein the modulated signal has a period having a duty cycle, the method comprising modifying the duty cycle of the modulated signal in response to comparing the measurement signal with the threshold.

* * * * *